United States Patent
Dong et al.

(10) Patent No.: US 10,067,777 B2
(45) Date of Patent: Sep. 4, 2018

(54) SUPPORTING MULTIPLE OPERATING SYSTEM ENVIRONMENTS IN COMPUTING DEVICE WITHOUT CONTENTS CONVERSION

(71) Applicant: INTEL CORPORATION, Santa Clara, CA (US)

(72) Inventors: Yao Zu Dong, Shanghai (CN); Jinkui Ren, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 14/779,237

(22) PCT Filed: Sep. 18, 2014

(86) PCT No.: PCT/CN2014/086843
§ 371 (c)(1),
(2) Date: Sep. 22, 2015

(87) PCT Pub. No.: WO2016/041173
PCT Pub. Date: Mar. 24, 2016

(65) Prior Publication Data
US 2016/0239321 A1 Aug. 18, 2016

(51) Int. Cl.
*G06F 9/455* (2018.01)
(52) U.S. Cl.
CPC ...... *G06F 9/45545* (2013.01); *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 6,192,471 B1 | 2/2001 | Pearce | |
| 2004/0064668 A1 | 4/2004 | Kjos | |
| 2007/0055860 A1* | 3/2007 | Wang | G06F 1/3203 713/2 |
| 2007/0288228 A1* | 12/2007 | Taillefer | G06F 9/45537 703/28 |
| 2008/0294808 A1* | 11/2008 | Mahalingam | G06F 13/105 710/26 |
| 2009/0182979 A1 | 7/2009 | Farrell | |
| 2010/0125856 A1 | 5/2010 | Dash | |

(Continued)

OTHER PUBLICATIONS

International Search Report for International Application PCT/CN2014/086843, dated May 28, 2015, 3 pages.

(Continued)

*Primary Examiner* — Tammy Lee
(74) *Attorney, Agent, or Firm* — Barnes & Thornburg LLP

(57) ABSTRACT

Multiple operating systems are supported on a computing device by disk virtualization technologies that allow switching between a native operating system and a virtualized guest operating system without performing a format conversion of the native operating system image, which is stored in a partition of a physical data storage device. The disk virtualization technologies establish a virtual storage device in a manner that allows the guest operating system to directly access the partition of the physical storage device that contains the native operating system image.

19 Claims, 6 Drawing Sheets

(56) References Cited

U.S. PATENT DOCUMENTS

| | | | | |
|---|---|---|---|---|
| 2010/0211769 A1* | 8/2010 | Shankar | .................. | G06F 9/441 |
| | | | | 713/2 |
| 2010/0250230 A1 | 9/2010 | Ganguly | | |
| 2011/0154318 A1 | 6/2011 | Oshins | | |
| 2013/0247039 A1* | 9/2013 | Tsutsui | .................. | G06F 3/0608 |
| | | | | 718/1 |
| 2014/0372726 A1* | 12/2014 | Koo | ........................ | G06F 12/10 |
| | | | | 711/206 |

OTHER PUBLICATIONS

Written Opinion for International Application PCT/CN2014/086843, dated May 28, 2015, 5 pages.

Partial supplementary European search report for European Patent Application No. 14902134.7-1224 dated Apr. 13, 2018, 13 pages.

\* cited by examiner

SUPPORTING MULTIPLE OPERATING SYSTEM ENVIRONMENTS IN COMPUTING DEVICE WITHOUT CONTENTS CONVERSION

CROSS REFERENCE TO RELATED APPLICATIONS

This application is a national stage entry under 35 USC § 371(b) of International Application No. PCT/CN2014/086843, which was filed Sep. 18, 2014.

BACKGROUND

A single computing device can be configured to run multiple operating systems. Current dual operating system architectures utilize dual boot or operating system (OS) toggling ("dual native OS") approaches, or virtualization ("dual virtual OS") techniques. Both dual native OS and dual virtual OS can be supported on the same device, but currently, a file format conversion is required in order to switch from a dual native OS environment to a dual virtual OS environment. That is, the OS image in the native environment needs to be converted to a format that can be recognized by the guest OS file system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
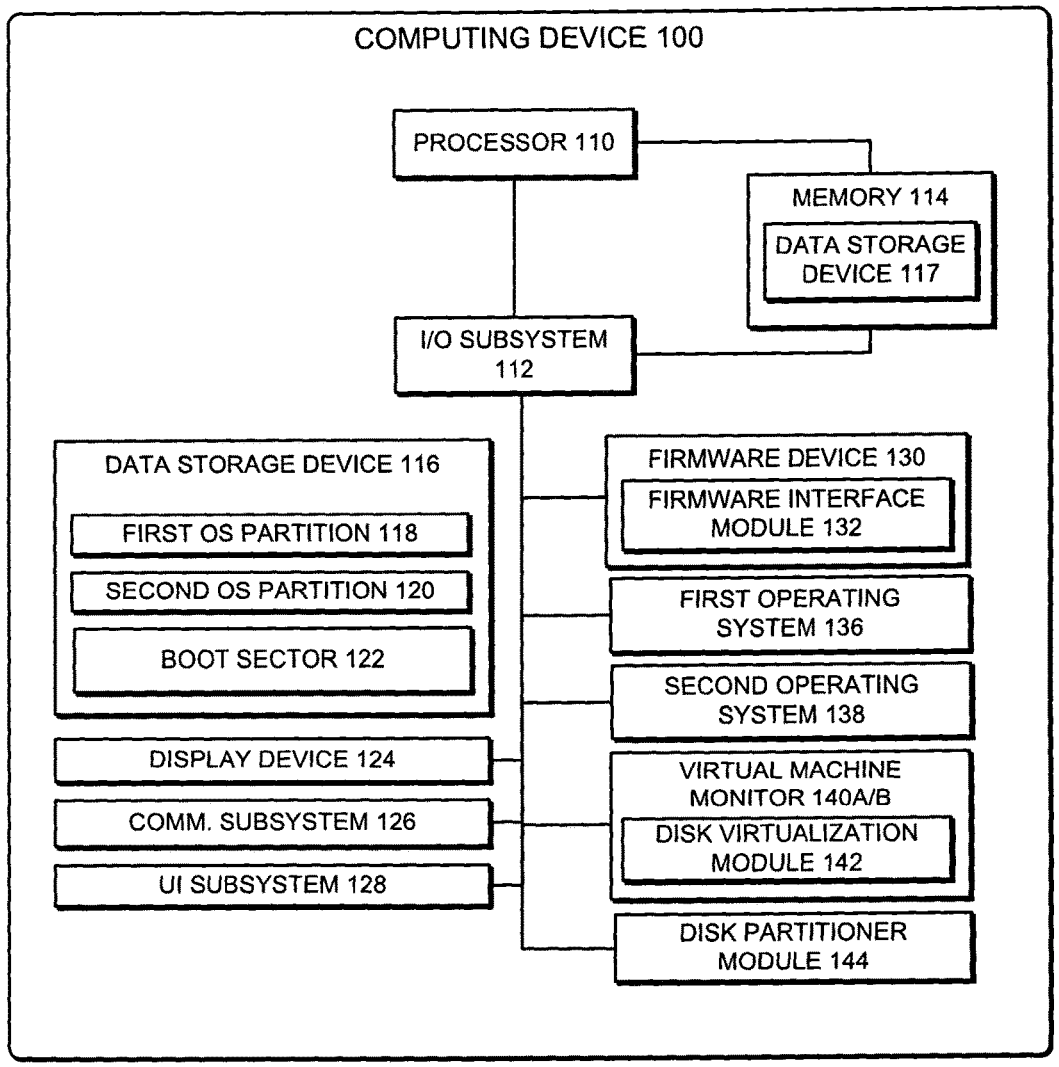
FIG. 1 is a simplified block diagram of at least one embodiment of a computing device configured to support multiple operating system environments as disclosed herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an embodiment of a computing device 100 is configured to support multiple operating system environments at runtime. A physical data storage device 116, 117 of the computing device 100 is partitioned to store different operating systems 136, 138 in different partitions 118, 120. A boot sector 122 of the data storage device 116, 117 contains a partition table (e.g., partition table 320, shown in FIG. 3) and boot code (e.g., boot code 322, shown in FIG. 3). The locations of the partitions containing the operating systems 136, 138 on the data storage device 116, 117, partition type data (which may indicate access level or privileges), and other partition information, are specified by the partition table 320. The boot code 322 is configured to support dual native operating systems using, e.g., a dual booting or operating system (OS) toggling technique.

Figure 2A:
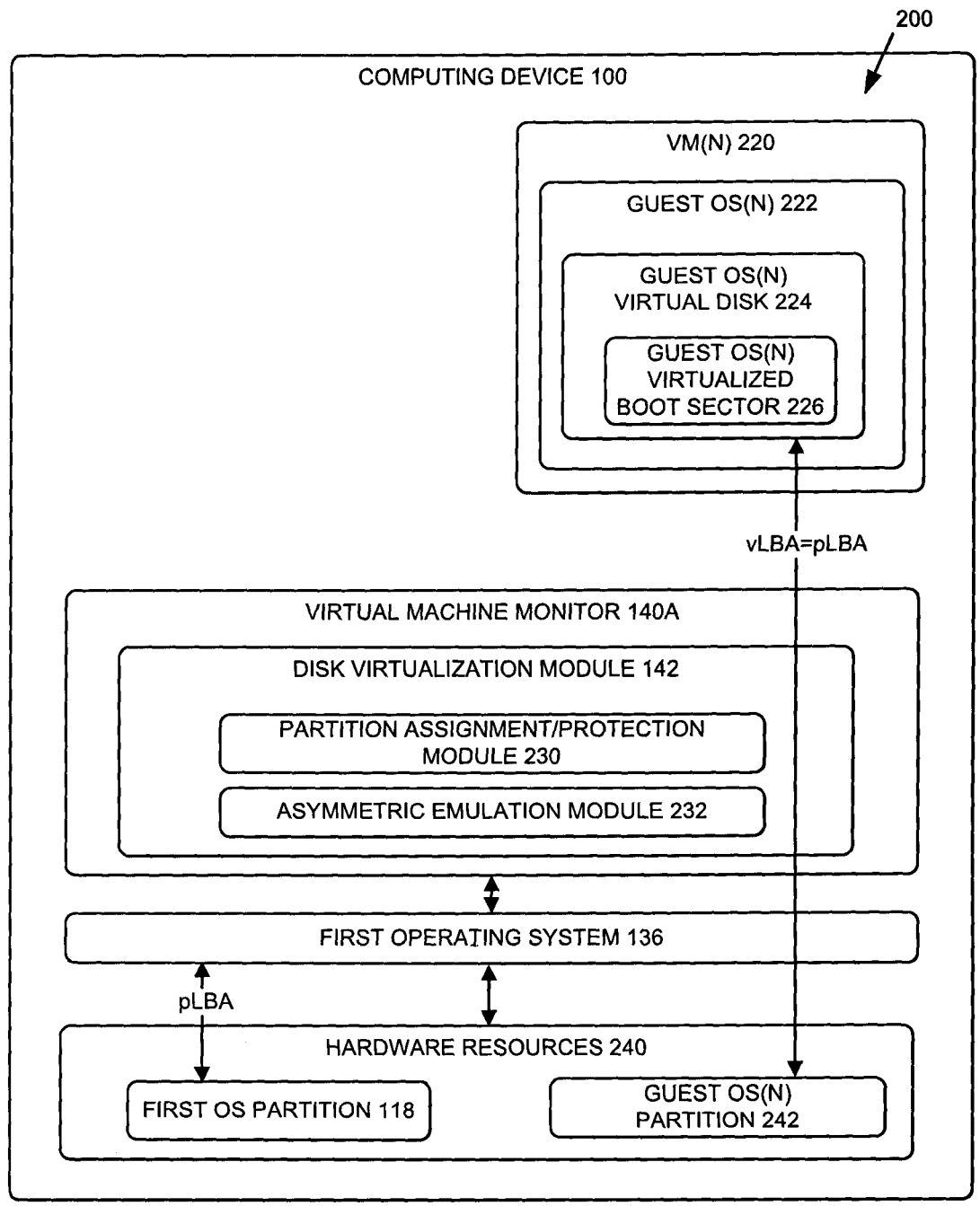
FIG. 2 is a simplified environment diagram of at least one embodiment of the computing device of FIG. 1.
Figure 2B:
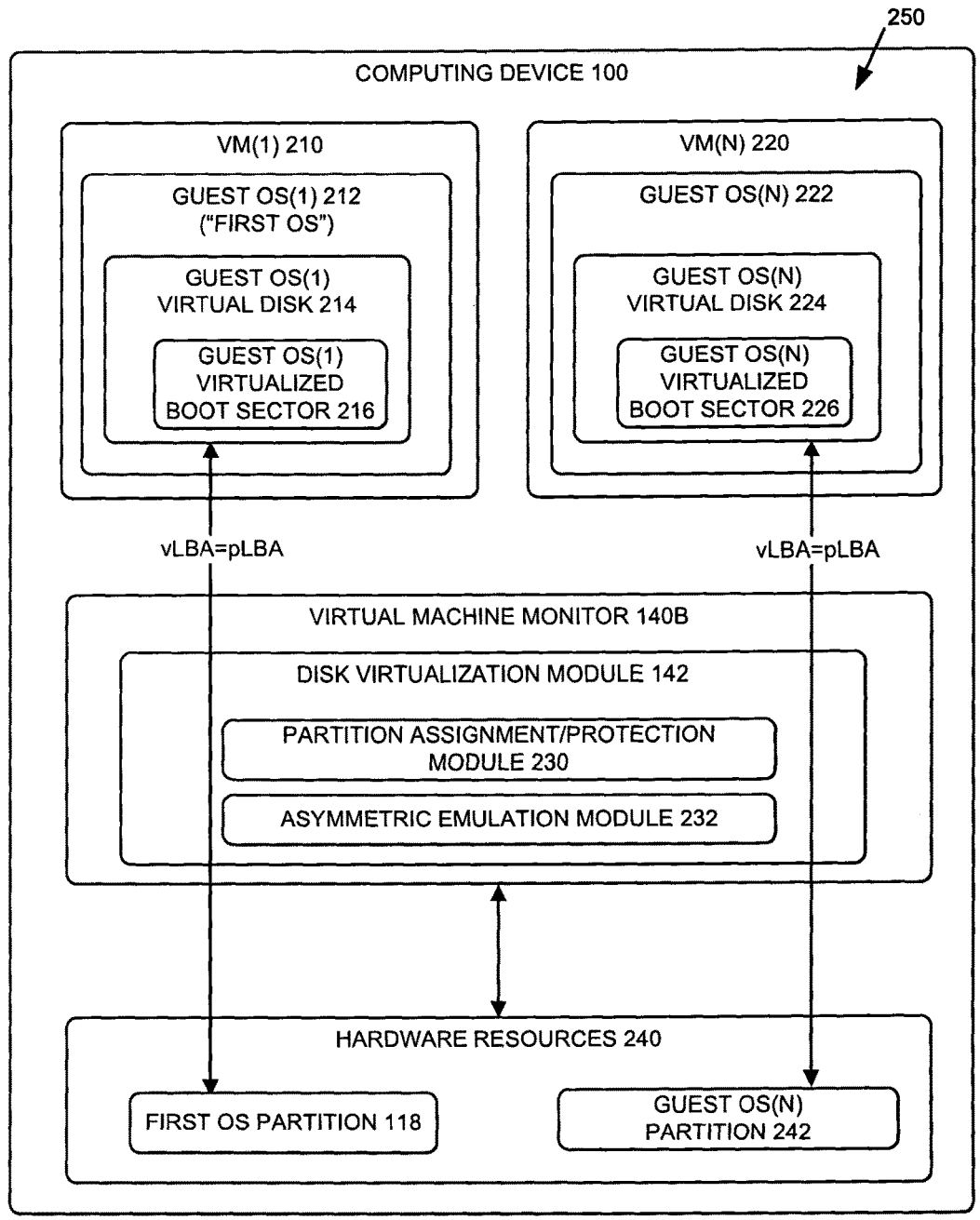

A virtual machine monitor (VMM) 140A/B of the computing device 100 can create a virtual runtime environment in which the operating systems 136, 138 can run as guest operating systems in separate virtual machines. An embodiment of the VMM 140A is shown in FIG. 2A, described below, and another embodiment of the VMM 140B is shown in FIG. 2B, described below. The virtual machine monitor 140A/B includes a disk virtualization module 142. As described in more detail below, the disk virtualization module 142 creates a virtual storage device in a manner that allows a guest operating system to directly access partitions (e.g., first OS partition 118, second OS partition 120) of the physical data storage device 116, 117 that are assigned to the guest operating system, and prevents the guest operating system from accessing other partitions 118, 120 that are not assigned to the guest operating system. In this way, the computing device 100 can switch between native and virtual operating system environments without performing a format conversion of the native operating system partition contents. As such, the computing device 100 can avoid many of the challenges associated with disk image conversion, including performance penalties, firmware wear-leveling (if flash memory is used), and inefficient use of physical disk space during switches from a virtual OS to a native OS. To simplify the description, references are made herein to "dual" operating systems, and only two native operating systems 136, 138 and two guest operating systems 212, 222 (FIG. 2) are shown. It should be understood, however, that the computing device 100 can support more than two native operating systems and/or more than two guest operating systems, in other embodiments.

The computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the illustrative computing device 100 includes at least one processor 110, memory 114, an input/output subsystem 112, a data storage device 116, 117 (which is divided into partitions 118, 120 and boot sector 122), a display device 124, a communication subsystem 126, a user interface (UI) subsystem 128, a firmware device 130 (which includes a firmware interface module 132), a first operating system 136, a second operating system 138, the virtual machine monitor 140A/B (which includes the disk virtualization module 142), and a disk partitioner module 144. The virtual machine monitor 140A/B or portions of the virtual machine monitor 140A/B may be referred to herein as a "virtualization service" or "hypervisor," in some embodiments. The computing device 100 may include other or additional components, such as those commonly found in a mobile and/or stationary computers (e.g., various sensors and input/output devices), in other embodiments. Additionally, in some embodiments, one or more of the illustrative components may be incorporated in, or otherwise form a portion of, another component. Each of the components of the computing device 100 may be embodied as software, firmware, hardware, or a combination of software and hardware.

The processor 110 may be embodied as any type of processor capable of performing the functions described herein. For example, the processor 110 may be embodied as a single or multi-core processor(s), digital signal processor, microcontroller, or other processor or processing/controlling circuit. The memory 114 of the computing device 100 may be embodied as any type of volatile or non-volatile memory or data storage capable of performing the functions described herein. In operation, the memory 114 may store various data and software used during operation of the computing device 100, such as operating systems, applications, programs, libraries, and drivers.

The memory 114 is communicatively coupled to the processor 110, e.g., via the I/O subsystem 112. The I/O subsystem 112 may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and/or other components of the computing device 100, on a single integrated circuit chip.

The data storage device 116, 117 may be embodied as any type of physical device or devices configured for short-term or long-term storage of data such as, for example, memory devices and circuits, memory cards (e.g., MultiMediaCard or MMC, Secure Digital or SD, embedded Multi-Media Controller or eMMC, etc.), harddisk drives, solid-state drives, a combination of multiple different memory technologies, such as a Non-Volatile Dual In-line Memory Module (NVDIMM), portions of which may be included in the memory 114 as shown by data storage device 117, or other data storage devices. While FIG. 1 shows two illustrative data storage devices 116, 117, it should be understood that embodiments of the computing device may include the data storage device 116, the data storage device 117, a combination of the data storage device 116 and the data storage device 117, and/or other data storage devices. The data storage device 116, 117 includes a number of partitions (e.g., one or more first OS partitions 118 and one or more second OS partitions 120), e.g., logical storage units of the data storage device 116, 117, to store operating system data files and executables, or operating system images, in different physical locations within the data storage device 116, 117. Although the partitions 118, 120 are shown in FIG. 1 as single blocks, it should be understood that each operating system 136, 138 may use one or multiple partitions. Additionally, for simplicity, FIG. 1 shows the partitions 118, 120 as located in the data storage device 116, but it should be understood that the data storage device 117 may be similarly partitioned. As such, references herein to the partitions 118, 120 include embodiments in which the partitions 118, 120 are provided in the data storage device 116, in the data storage device 117, in both data storage devices 116, 117, or in other data storage devices. As used herein, a "disk image" may refer to, among other things, a self-contained, pre-made installation of an operating system, including all of the contents of the disk that are used by the operating system. For example, a disk image used by a primary or "host" or "preferred" operating system (e.g., first operating system 136 or second operating system 138) may be referred to as a "physical" or "host-used" disk image. A disk image used by a guest operating system (e.g., guest operating system 212 or guest operating system 222) may be referred to as a "virtual" or "guest-observed" disk image, and may be embodied as a file containing the contents of the guest disk (e.g., the virtual disk 214 or the virtual disk 224). A guest-observed disk image may be stored in the file system of the primary or "host" operating system, or in a partition of the host operating system's physical storage (e.g., a partition 118, 120).

The display device 124 may be embodied as any type of display capable of displaying digital information such as a liquid crystal display (LCD), a light emitting diode (LED), a plasma display, a cathode ray tube (CRT), or other type of display device. In some embodiments, the display device 124 may be coupled to a touch screen or other human computer interface device to allow user interaction with the computing device 100. The display device 124 may be part of a user interface (UI) subsystem 128. The user interface subsystem 128 may include a number of additional devices to facilitate user interaction with the computing device 100, including physical or virtual control buttons or keys, a microphone, a speaker, a unidirectional or bidirectional still and/or video camera, and/or others. The user interface subsystem 128 may also include devices, such as motion sensors, proximity sensors, and eye tracking devices, which may be configured to detect, capture, and process various other forms of human interactions involving the computing device 100.

The computing device 100 further includes a communication subsystem 126, which may be embodied as any communication circuit, device, or collection thereof, capable of enabling communications between the computing device 100 and other electronic devices. The communication subsystem 126 may be configured to use any one or more communication technology (e.g., wireless or wired communications) and associated protocols (e.g., Ethernet, Bluetooth®, Wi-Fi®, WiMAX, 3G/LTE, etc.) to effect such communication. The communication subsystem 126 may be embodied as a network adapter, including a wireless network adapter.

The illustrative computing device 100 also includes a firmware device 130 and a number of computer program components, such as the boot sector 122, the firmware interface module 132, the first operating system 136, the second operating system 138, the virtual machine monitor 140A/B, and a disk partitioner module 144. The firmware device 130 is embodied as any suitable form of read-only memory (e.g., flash memory). The firmware interface module 132 is embodied as software, hardware, or a combination of software and hardware, on the firmware device 130. The firmware interface module 132 initializes hardware and peripheral components of the computing device 100 after the computing device 100 is powered on or re-booted. The firmware interface module 132 also loads the boot sector 122 into main memory (e.g., memory 114), and transfers execution to the boot code 322. Examples of firmware interface modules include BIOS (Basic Input Output System) and UEFI (Uniform Extensible Firmware Interface).

As noted above, the boot sector 122 contains the partition table 320. The partition table 320 is established during the partitioning of the data storage device 116, 117 (e.g., by the disk partitioner module 144, described below). The boot sector 122 also includes the boot code 322 (e.g., a "primary boot loader"), which loads and starts execution of an operating system (e.g., first OS 136 or second OS 138). The boot code 322 supports the dual native OS capabilities of the computing device 100. For example, the boot code 322 may implement a dual boot technique in which native OS switching can be accomplished by re-booting the computing device 100, or the boot code 322 may implement an OS toggling method in which native OS switching is performed by suspending the currently active native operating system (e.g., first OS 136) and booting an alternative operating system (e.g., second OS 138). Some examples of boot loaders that can boot multiple operating systems or provide a choice of operating systems to boot are GNU GRUB (GNU Grand Unified Bootloader) and LILO (LInux Loader).

The boot code 322 may boot either the first operating system 136 or the second operating system 138 as the primary operating system (e.g., from system power-on) of the computing device. To simplify the description, however, the first operating system 136 is described herein as performing the duties of the primary operating system, which may include launching the virtual machine monitor 140A in the embodiment of FIG. 2A, as described below. Accordingly, the operating system that is designated as the primary operating system may have greater privileges than other operating systems with respect to the control of the computing device 100.

In the embodiment of FIG. 2A, the first operating system 136, or in some cases, the VMM 140A, may facilitate communication between the virtual machine monitor 140A and hardware components of the computing device 100. In other embodiments, such as the embodiment of FIG. 2B, described below, the virtual machine monitor 140B executes directly from the firmware or hardware of the computing device 100 (e.g., by the boot code 322). The first operating system 136 may be embodied as any operating system capable of performing the functions described herein, such as a version of WINDOWS by Microsoft Corporation, ANDROID by Google, Inc., and/or others. Similarly, the second operating system 138 may be embodied as any operating system (or version of an operating system) that is capable of performing the functions described herein. For example, the first OS 136 and second OS 138 may be different operating systems made by different vendors or different versions of the same operating system. As mentioned above, one or the other of the operating systems 136, 138 may be designated as the primary operating system.

The virtual machine monitor 140A of FIG. 2A is launched by the boot code 322, directly from the firmware interface module 132, by the first operating system 136, or by the second operating system 138. The virtual machine monitor 140A is embodied as a "Type II" virtual machine monitor or "host-based" virtualization model (e.g., a WINDOWS-based VMM or a kernel-based hypervisor (KVM)). The virtual machine monitor 140B of FIG. 2B is embodied as a "Type I" virtual machine monitor or "thin" (or "bare metal") hypervisor, and the guest OS(1) is the preferred or "privileged" OS that can directly access the first OS partitions 118. In general, the virtual machine monitor 140A/B is embodied as a privileged software or firmware component that facilitates and manages the virtualization of shared resources of the computing device 100, in particular the data storage device 116, 117. As such, the virtual machine monitor 140A/B executes in a higher-privileged system mode of the computing device 100 in which the virtual machine monitor 140A/B may have substantially full control of the data storage device 116, 117 and/or other hardware resources of the computing device 100. As described below with reference to FIG. 2A and FIG. 2B, the virtual machine monitor 140A/B can establish a virtualization environment for the data storage device 116, 117 that includes multiple virtual machines, with each virtual machine running a guest operating system supported by its own virtual storage device. Examples of disk virtualization services include a virtual SATA (serial ATA) disk, a virtual SCSI (Small Computer System Interface) disk, a paravirtualized block device driver such as VBD (Virtual Block Device) in Xen. The illustrative disk virtualization module 142 is embodied as a component of the VMM 140A/B. In operation, the disk virtualization module 142 creates a virtual storage device for each of the guest operating systems in the different VMs, to control access to the partitions 118, 120 of the data storage device 116, 117 by the guest operating systems, as described below.

The disk partitioner module 144 is embodied as any suitable hardware, firmware, or software for partitioning the data storage device 116, 117 as described herein (e.g., for creating the partitions 118, 120 and formatting the data storage device 116, 117). The disk partitioner module 144 partitions the data storage device 116, 117 according to any suitable partitioning scheme, such as the Master Boot Record (MBR) scheme or the Globally Unique Identifier (GUID) Partition Table or "GPT" scheme, and then format the data storage device 116, 117. The disk partitioner module 144 may be a component of a dual OS installation tool, such as F disk.

As a result of partitioning, the data storage device 116, 117 contains multiple partitions 118, 120. Each partition 118, 120 includes a file system (not shown). The file system defines and controls the storage and retrieval of data by the operating system 136, 138 installed on the partition 118, 120. Each partition 118, 120 is made up of a number of sectors (not shown). Each sector stores a fixed amount of data (e.g., a block of 512 bytes or 4096 bytes). The file system of a partition 118, 120 addresses each sector of the partition 118, 120 by a physical location identifier that identifies the location of the sector on the physical data storage device 116, 117. An example of a physical location identifier is the logical block address (LBA). The logical block address is referred to herein as the "physical" LBA or "pLBA." The pLBA of a sector is defined as an offset of the sector from the beginning of the physical data storage device 116, 117.

Referring now to FIGS. 2A and 2B, in some embodiments, the computing device 100 establishes an environment 200 during operation (e.g., native and/or virtual runtime or "execution" environments). The various modules depicted in the environment 200 may be embodied as hardware, firmware, software, or a combination thereof. In the environment 200, the first operating system 136 facilitates communication between the virtual machine monitor 140A and hardware resources 240 of the computing device 100, including the data storage device 116, 117. In the embodiment of FIG. 2A, the virtual machine monitor 140A establishes a virtual machine 220 for each of "N" non-privileged guest operating systems 222 (where "N" is a positive integer), and establishes a guest OS(N) partition 242 of the data storage device 116, 117, for each of the N non-privileged guest operating systems 222. That is, in the embodiment of FIG. 2A, the virtual machine monitor 140A can establish a number of VMs 220 for non-privileged guest operating systems 222, and the first operating system 136 acts as the privileged OS (running natively). In the embodiment of FIG. 2B, the virtual machine monitor 140B establishes a VM(1) 210 for a privileged guest OS(1) 212 (running, e.g., the first operating system 136), and any number of VMs 220 for other non-privileged guest operating systems 222. For simplicity, the privileged and non-privileged VMs 210, 220 and guest OS's 212, 222 are treated collectively in the following discussion, since in the embodiment of FIG. 2B, the disk virtualization module 142 handles the privileged and non-privileged VMs 210, 220 and guest OS's 212, 222 in a similar manner.

The disk virtualization module 142 of the virtual machine monitor 140A creates a virtual disk 214, 224 (or "virtual storage device"), including a virtualized boot sector 216, 226, to support each guest operating system 212, 222, directly running from the physical partitions (e.g., the first OS partition 118, for the privileged guest OS(1) 212 or a guest OS(N) partition 242, for a non-privileged guest OS(N) 222, where the partition 242 may map to the second OS partition 120, or to portions of the first and second OS partitions 118, 120, or to other portions of the data storage device 116, 117). To do this, the disk virtualization module 142 sets the size of the virtual disk 214, 224 to equal the size of the physical data storage device 116, 117. Additionally, the illustrative disk virtualization module 142 includes a partition assignment/protection module 230 and an asymmetric emulation module 232, described below. Each of the modules 230, 232 may be embodied as hardware, firmware, software, or a combination thereof. When the disk virtualization module 142 creates a virtual disk 214, 224, the partition assignment/protection module 230 assigns the appropriate partitions 118, 242 of the physical data storage device 116, 117 to the virtual disk 214, 224 according to one or more partition assignment criteria or policies. The partition assignment criteria/policy may be specified by the disk virtualization module 142 and/or by user configuration of the disk virtualization module 142. The partition assignment/protection module 230 identifies each of the assigned partitions 118, 242 to the guest operating system 212, 222 by a virtual location identifier ("vLBA"). In doing so, the partition assignment/protection module 230 sets the vLBA equal to the pLBA of the assigned partition 118, 242 (e.g., vLBA=pLBA). This is in contrast to current dual virtual OS techniques in which the vLBA is not identical to the pLBA because, in those systems, the vLBA is an offset from the beginning of the virtual disk 214, 224, not an offset from the beginning of the physical data storage device 116.

For partitions 118, 242 (or sectors of the partitions 118, 242, or other sectors of the data storage device 116, 117) that are not assigned to the guest operating system 212, 222, the partition assignment/protection module 230 protects these non-assigned partitions/sectors from access by the guest operating system 212, 222. To do this, the partition assignment/protection module 230 maps each of the non-assigned partitions/sectors to a pattern sector, e.g., by virtually padding the non-assigned partitions/sectors with dummy data (such as a NULL pattern, e.g., a string of zeros), or by mapping the unassigned partitions/sectors to a non-existing sector that does not have a storage location on the physical data storage device 116, 117. As a result, the virtual disk 214, 224 is constructed without a complete one-to-one mapping between the virtual disk 214, 224 and the backing storage (i.e., the data storage device 116). At the same time, however, the virtual disk 214, 224 can access the contents of its assigned partitions 118, 242 directly, because the virtual location identifiers (vLBAs) of the assigned partitions 118, 242 on the virtual disk 214, 224 match the physical location identifiers (pLBAs) of the partitions 118, 242 on the physical data storage device 116, 117. Accounting for the non-assigned partitions/sectors allows the disk virtualization module 142 to make the size of the virtual disk 214, 224 match the size of the data storage device 116, 117, and thus, to set the vLBA to be identical to the pLBA for the partitions that are assigned to the guest operating system 212, 222. In other words, the disk virtualization module 142 constructs the virtual disk 214, 224 so that the partitions 118, 242 required by the guest operating system 212, 222 are in the same locations on the virtual disks 214, 224 as they are on the data storage device 116, 117, but one-to-one mapping between the location of the non-assigned partitions/sectors on the virtual disk 214, 224 and the location of the non-assigned partitions/sectors on the data storage device 116, 117 is not required.

The asymmetric emulation module 232 of the disk virtualization module 142 provides the emulation of the virtual disk 214, 224 at runtime, where the emulation is "asymmetric" in the sense that the emulation can be different for different sectors of the data storage device 116, 117. To do this, the asymmetric emulation module 232 virtualizes the boot sector 122 (including the partition table 320) as a virtualized boot sector 216, 226, to allow the guest operating system 212, 222 to access and perhaps modify portions of the boot sector 122 virtually. However, any modifications made by the guest operating system 212, 222 to the virtual boot sector 216, 226 (e.g., modifications to the virtual partition table 340) may or may not be accepted as modifications to the physical partition table 320, depending on the particular design or implementation requirements of the computing device 100. This is due to the fact that write operations by the guest operating system 212, 222 to partitions/sectors of the data storage device 116, 117 that are not assigned to the virtual disk 214, 224 can be denied as a result of the use of the pattern sector, as explained below. The asymmetric emulation module 232 implements an asymmetric disk operation emulation mechanism, which: (i) allows the guest operating system 212, 222 to access partitions/sectors of the data storage device 116, 117 that are assigned to the guest operating system 212, 222 with vLBA=pLBA, in which case the emulation returns the physical partition/sector to the guest operating system 212, 222; (ii) fully emulates some sectors of the data storage device 116, 117, such as special management sectors (e.g., the MBR, boot code 322); and (iii) emulates the normal data partitions/sectors that are not assigned to the guest operating system 212, 222 by returning a dummy pattern or non-existing sector. In doing so, the asymmetric emulation module 232 allows the guest operating system 212, 222 to read or write any sectors of the data storage device 116, 117, but the write may be ignored or may fail if the guest operating system 212, 222 tries to write the non-assigned data sectors, or the read may not get the expected physical sector data (but rather the dummy data), or the read may not even get the data that was previously written to the sector (if the sector is mapped to a non-existing sector). For example, if the non-assigned partition/sectors have the contents of an emulated pattern sector, the guest operating system 212, 222 can read "000000," but the emulation mechanism will cause any write operation attempted by the guest operating system 212, 222 to become a NULL operation or to be omitted.

Referring now to FIG. 2B, the components of the virtual machine monitor 140B operate in a similar fashion to the components of FIG. 2A, described above, except that the embodiment of FIG. 2B does not include the first operating system 136 running natively to facilitate communications between the VMM 140B and the hardware resources 240 of the computing device 100. In the embodiment of FIG. 2B, the computing device 100 establishes an environment 250 during operation (e.g., native and/or virtual runtime or "execution" environments). The various modules depicted in the environment 250 may be embodied as hardware, firmware, software, or a combination thereof. In the environment 250, the virtual machine monitor 140B establishes the virtual machines 210, 220 and facilitates communications between the guest operating systems 212, 222 and the hardware resources 240 of the computing device 100. One of the guest operating systems 212, 222 may be designated as a "preferred" operating system that has greater privileges than other guest operating systems. As discussed above, in the illustration of FIG. 2B, the guest OS(1) 212 operates as the preferred operating system.

The disk virtualization module 142, including the partition assignment/protection module 230 and the asymmetric emulation module 232, operate in the virtual machine monitor 140B in a similar fashion as described above with respect to the virtual machine monitor 140A. Accordingly, the description of the modules 142, 230, 232 is not repeated here. Each of the modules 142, 230, 232 of the virtual machine monitor 140B may be embodied as hardware, firmware, software, or a combination thereof.

Figure 3:
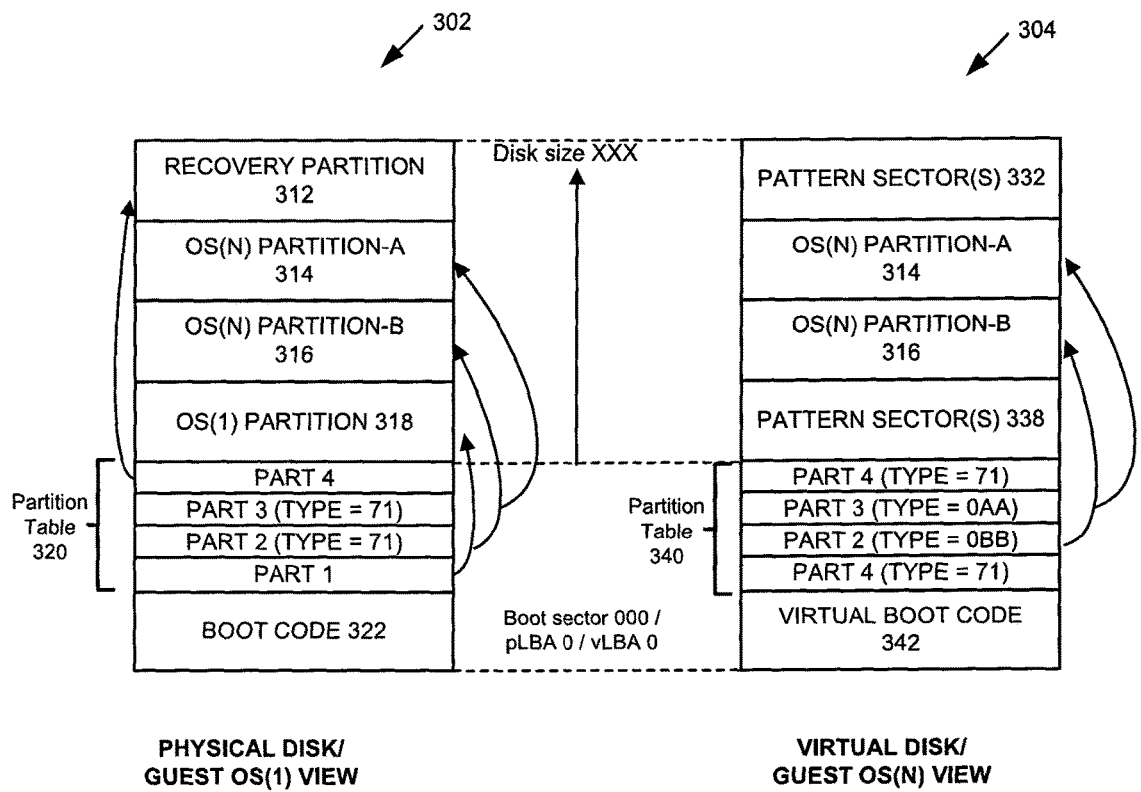
FIG. 3 is a simplified schematic diagram illustrating at least one embodiment of physical and virtual disk layouts for the computing device of FIG. 1 as disclosed herein.

Referring now to FIG. 3, an example of disk layouts 302, 304 for the computing device of FIG. 1 to support multiple operating systems using a master boot record (MBR) partitioning scheme is shown. While FIG. 3 depicts the disk layouts 302, 304 in the context of the VMM 140A (e.g., a "Type II" hypervisor), it should be understood that the disk layouts 302, 304 may be readily adapted to other VMM architectures. In the example, a first operating system, OS(1), is designated as the first operating system 136 and an "Nth" operating system, OS(N) is designated as the second operating system 138. As shown in the disk layout 302, in some cases, an operating system may use multiple partitions (e.g., OS(N) partitions 314, 316). The disk layout 302 shows the layout of the physical data storage device 116, which also corresponds to the layout seen by the first operating system, OS(1), when OS(1) is running in a VM as a guest operating system. In the layout 302, the boot sector 122 includes the boot code 322 and the partition table 320. The boot sector (e.g., partition table 320, boot code 322) is designated as "000," which corresponds to PLBA 0, and vLBA=pLBA=0). After the boot sector (e.g., partition table 320, boot code 322), the data storage device 116, 117 is partitioned into four parts, in the MBR implementation. In other implementations, such as implementations in which the GPT partitioning scheme is used, the data storage device 116, 117 may be divided into any number of partitions.

An OS(1) partition 318 stores the first operating system, OS(1). Two partitions 314, 316 store the Nth or alternate operating system, OS(N). A partition 312 stores a recovery image (the type and format of which may be specified according to implementation requirements). It should be understood that each of the partitions 312, 314, 316, 318 are primary partitions that can be further partitioned into multiple extended partitions (according to internal operating system needs, for example).

In the layout 302, the partition table 320 defines the partitions 314, 316 as "type=71," which designates a "reserved" partition to OS(1). As a result, access to the partitions 314, 316 by the operating system OS(1) is restricted, but may be permitted by modifying the partition table 320. Access by OS(1) to the partitions 314, 316 can be enforced by the emulation module 232, and even if OS(1) is running as a native OS instead of a virtual OS. As shown in the layout 304, from the point of view of the Nth or alternative operating system, OS(N), running as a guest OS, the OS(N) sees the same size of disk (e.g., the disk size XXX is the same for both layouts 302, 304), but OS(N) can only read/write its own partitions 314, 316. The boot sector (e.g., partition table 320 and boot code 322) (e.g. MBR) is purely virtualized (e.g., by the disk virtualization module 142) as a virtual boot sector (e.g., partition table 340 and boot code 342) (e.g., an "instance" of the boot sector 122). Additionally, in the layout 304, the partition type of each of the partitions 314, 316 is set to a value that the OS(N) file system can recognize (e.g., 00AA and 00BB). Further, the partitions 312 and 318 are not assigned to the virtual disk and as such, are mapped to pattern sectors 332, 338. The emulation module 232 creates the partition table 340 and assigns type=71 to the pattern sectors 332, 338, so that OS(N) won't access the pattern sectors 332, 338. Further, the OS(N) running as a guest OS may be able to modify the virtual boot sector (e.g., partition table 340 or boot code 342), but the modifications may not be propagated to the partition table 320. In some cases, however, the OS(N) may be permitted to modify the partition table 320 for limited purposes (e.g., to shrink the access size). In some cases, the emulation module 232 may permit the OS(N) to modify the boot code 322 and in those instances in which OS(N) modifies the boot code 322, the emulation module 232 will virtualize the modified contents of the boot code 322.

In addition, if the OS(N) accesses blocks outside of its own partitions 314, 316, a NULL operation may result (e.g., a read operation by OS(N) will get the pattern sector, such as "000000" data, while a write operation is omitted). The OS(N) running as a guest operating system can "re-use" the partitions 314, 316 created in the native environment using the MBR scheme, because the vLBA of those partitions is the same as the pLBA. The virtual boot sector (e.g., partition table 340 and boot code 342) may be stored by the disk virtualization module 142 in a file in the file system of the host operating system (e.g., OS(1) in the example of FIG. 3), in accordance with the host file system's own policy.

In another example, the data storage device 116, 117 is partitioned using a GPT partitioning mechanism, and a similar virtualization policy may be applied. In the GPT scheme, the number of partitions may be larger than in the MBR scheme and can support many VMs. In the GPT scheme, the OS(N) partition may use a "reserved" partition type GUID in the physical disk layout 302, so that OS(1) cannot access the OS(N) partitions. In the layout 304, the OS(N) running as a guest operating system can only see its own partitions, and the boot sector (which includes the primary and secondary GPT headers, and the protective MBR, in the GPT scheme) are purely virtualized by the disk virtualization module 142. The partition type of the OS(N) partitions 314, 316 in the virtual partition table 340 is recovered so that OS(N) running as guest can recognize the partitions 314, 316. The guest OS(N) can modify the virtual GPT headers and virtual protective MBR, but the modification is applied only to the virtual disk, and the guest OS(N) may not be able to modify the physical GPT headers and protective MBR. Access by the OS(N) to sectors outside of its partitions 314, 316 may result in a NULL operation (e.g., a read operation by OS(N) will get the pattern sector, such as "000000" data, while a write operation is omitted). The OS(N) running as a guest operating system can "re-use" the partitions 314, 316 created in the native environment according to the GPT scheme, because the vLBA of those partitions is the same as the pLBA. The guest GPT headers and protective MBR may be stored by the disk virtualization module 142 in a file in the file system of the host operating system (e.g., OS(1) in the example of FIG. 3), in accordance with the host file system's own policy.

Figure 4:
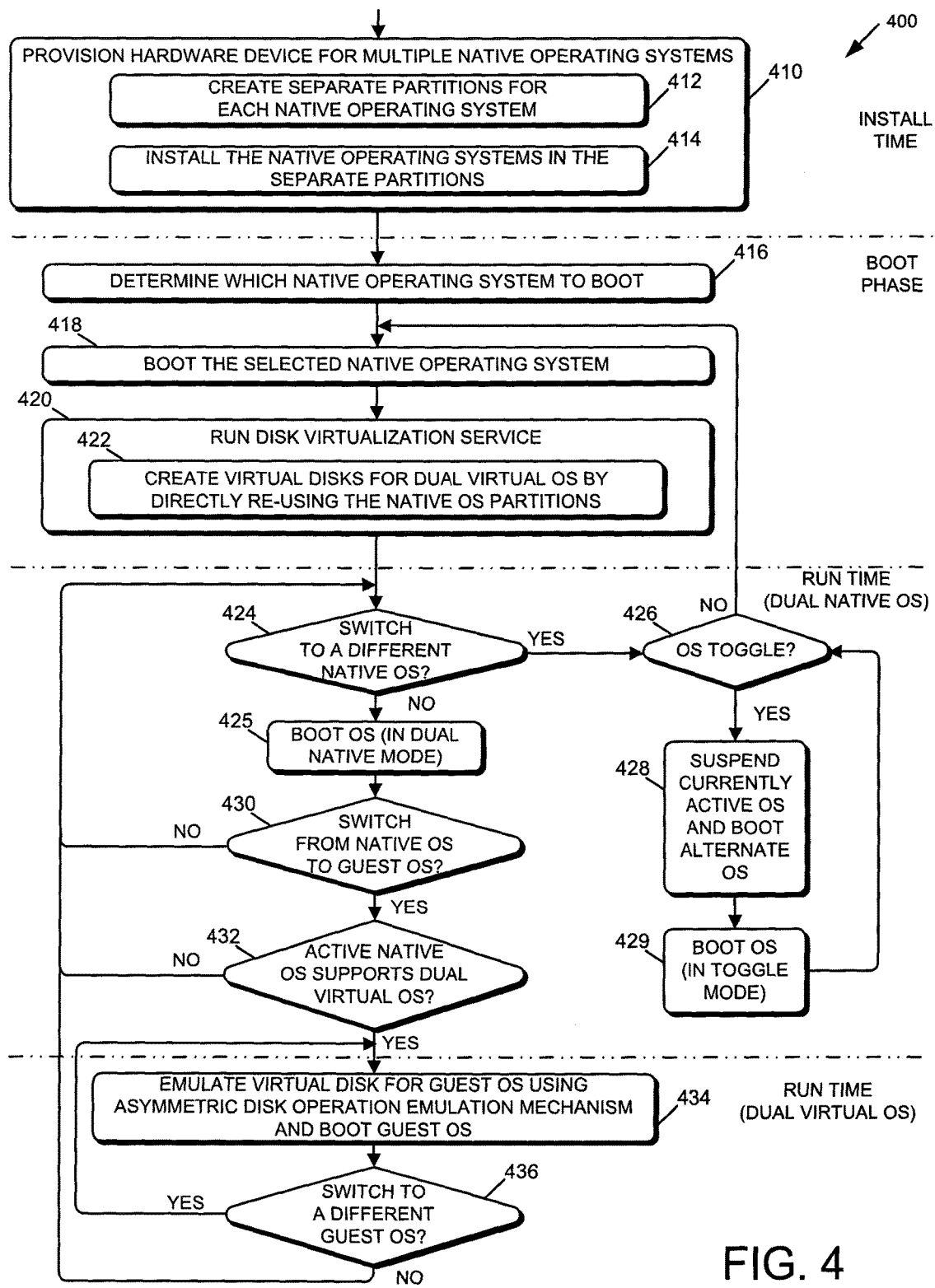
FIG. 4 is a simplified flow diagram of at least one embodiment of a method for supporting multiple operating system environments, which may be executed by the computing device of FIG. 1.

Referring now to FIG. 4, an example of a method 400 for supporting multiple operating system environments on a single computing device is shown. Portions of the method 400 may be executed by hardware, firmware, and/or software of the computing device 100. While FIG. 4 depicts the method 400 in the context of the VMM 140A (e.g., a "Type II" VMM), it should be understood that the method 400 may be readily adapted to other VMM architectures. For example, in a "Type I" VMM, the VMM may be loaded prior to booting the operating systems 136, 138, during the boot phase described below.

At block 410 (install time), the computing device 100, or more particularly the data storage device 116, 117, is provisioned to support multiple native operating systems. To do this, separate partitions are created on the data storage device 116, 117 (block 412), and the native operating systems are installed in separate partitions (block 414). Portions of block 410 may be performed when the computing device 100 is initially provisioned or at a later time, e.g., by an original equipment manufacturer (OEM) or an end user, using a disk partitioning tool such as the disk partitioner module 144.

During a boot phase of the computing device 100, the computing device 100 (e.g., a bootloader) determines which of the multiple native operating systems installed in block 414 to boot at block 416. To do this, the computing device 100 may determine which of the multiple operating systems is designated as the "first operating system 136, or may select one of the operating systems in response to user input or other criteria, such as a software application to be run in a particular OS or firmware environment on the computing device 100. At block 418, the computing device 100 (e.g., the bootloader) boots the native operating system selected in block 416. At block 420, the computing device 100 (e.g., the operating system started at block 418) launches a virtual machine monitor (such as a Type I or Type II VMM). The virtual machine monitor includes a disk virtualization service (e.g., the disk virtualization module 142). The disk virtualization service may be a component of a system virtualization service (e.g., a hypervisor) or a separate component that is launched by the hypervisor, for example. The disk virtualization service creates a virtual storage device (e.g., virtual disks 214, 224) for a dual virtual operating system environment, at block 422. In doing so, the disk virtualization service may directly re-use the contents of the native operating system partitions created in block 410. To do this, the disk virtualization service configures the virtual storage device to have the same size as the data storage device, assigns a subset of the partitions to the virtual storage device, addresses each of the assigned partitions using the same address identifier as is used in the native environment, associates a partition type with each of the partitions, maps each of the partitions/sectors that are not assigned to the virtual storage device to a pattern sector, and virtualizes the boot sector of the data storage device 116, 117. Following block 420, the computing device 100 operates a dual native runtime mode in which the operating system selected at block 416 is running natively.

At block 424, the computing device 100 determines whether to switch to a different native operating system, based on, e.g., end user input or interactions with the computing device 100 (e.g., by the UI subsystem 128). If the computing device 100 is to switch to a different native OS (e.g., the computing device 100 has received a new OS selection at block 424), the computing device 100 determines if the dual native OS environment is configured using an OS toggling technique, at block 426. If the computing device 100 determines in block 426 that an OS toggling technique is not used, the computing device 100 may conclude that a dual boot technique is used, and return to block 418 to re-boot the selected OS using the dual boot technique. In block 424, the computing device 100 may execute a program using the firmware interface to select the to-boot OS as the default OS at re-boot time, and then proceed to block 425 to re-boot using the OS selected in block 424. If in block 426, the computing device 100 (e.g., the firmware interface module 132) determines that an OS toggling technique is used, then in block 428, the computing device 100 suspends the currently active native OS (e.g., the OS booted at block 418), and may execute a program using the firmware interface (e.g., BIOS) to select the to-boot OS as the default OS at reboot time, and, in block 429, boot the alternate native OS selected at block 424, (using, e.g., a firmware-provided API). Following block 425, block 429 or the re-booting with the alternate OS accomplished using a dual boot technique at block 418, the computing device is running the alternate OS in the dual native OS runtime mode.

At block 430, the computing device 100 determines whether to switch from the currently active native OS to a guest operating system based on, e.g., end user input or interactions with the computing device 100 (e.g., by the UI subsystem 128). If the computing device 100 is to continue running in the currently active native OS, the computing device 100 returns to block 424. If the computing device 100 is to switch to a guest OS, then at block 432 the computing device 100 determines whether the currently active native OS is capable of supporting a dual virtual OS environment. If the computing device 100 determines that the currently active native OS does not support a dual virtual OS environment, the computing device returns to block 424. If the computing device 100 determines that the currently active native OS supports a dual virtual OS, then at block 434, the computing device 100 (e.g., the virtual machine monitor 140A/B and the disk virtualization module 142) emulates the virtual storage device created at block 422 for a guest operating system (e.g., a guest OS selected or determined at block 430) using an asymmetric disk operation emulation mechanism, and boots the guest OS. In doing this, the computing device 100 may restrict the guest operating system's direct access to the physical data storage device 116, 117 to only those partitions or sectors that are assigned to the guest operating system based on an assignment policy or criteria. To do this, the computing device 100 may read the pattern sectors (e.g., "dummy data") in place of the non-assigned partitions.

Following block 434, the computing device 100 is running a dual virtual operating system (virtualized) runtime mode. At block 436, the computing device 100 determines whether to switch to another guest OS (and remain in the dual virtual OS mode) based on, e.g., end user input or interactions with the computing device 100 (e.g., by the UI subsystem 128). If the computing device 100 is to continue operating in the dual virtual OS mode running the currently active guest OS, the computing device 100 continues running the currently active guest OS unless it receives a trigger (e.g., end user input or interactions with the computing device 100) to switch to a different native OS (in which case the computing device 100 returns to block 424). If the computing device 100 is to switch to a different guest OS, the computing device 100 determines the new guest OS (by, e.g., receiving end user input or interactions with the computing device 100) and returns to block 434. In this way, the computing device 100 can switch from one native OS to another, from one guest OS to another, from a native OS to a guest OS, or from a guest OS to a native OS, during interactive operation of the computing device.

Figure 5:
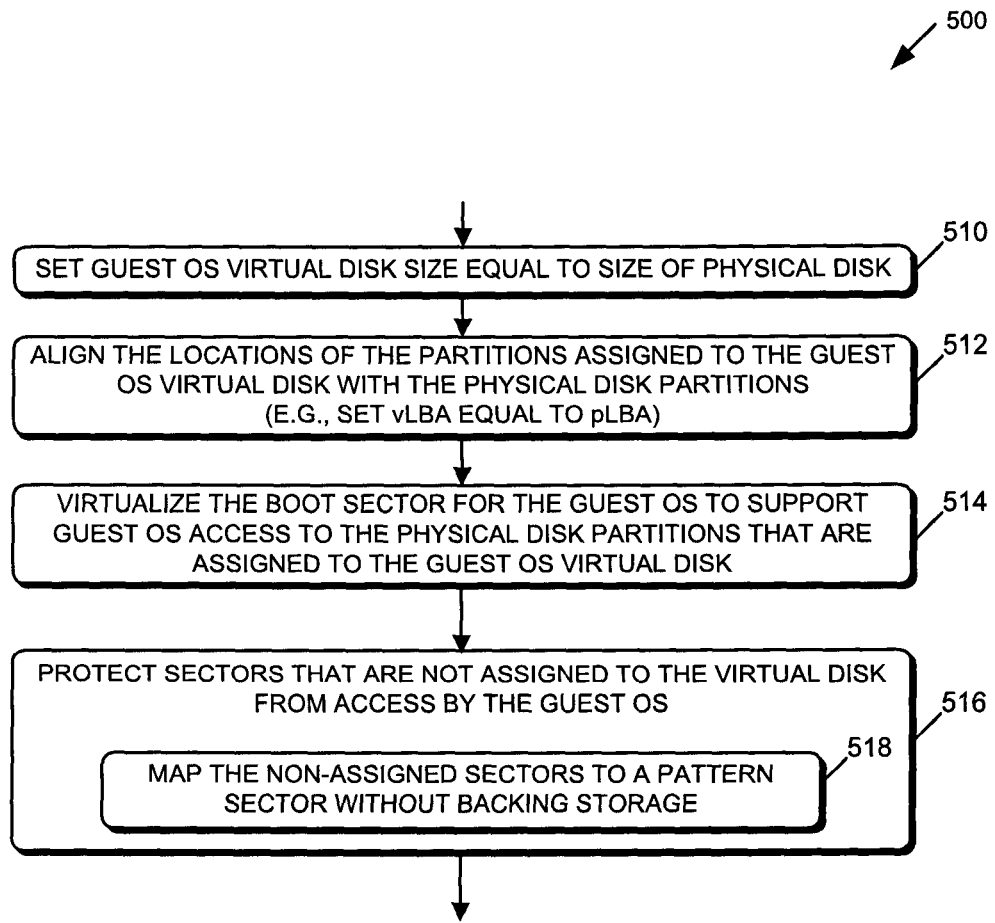
FIG. 5 is a simplified flow diagram of at least one embodiment of a method for creating a virtual disk to support a guest operating system, which may be executed by the computing device of FIG. 1.

Referring now to FIG. 5, an example of a method 500 for creating a virtual disk to support a guest operating system, which may be executed by the computing device 100 as part of block 422 of FIG. 4, is shown. Portions of the method 500 may be executed by hardware, firmware, and/or software of the computing device 100; for example, by the VMM 140A/B. At block 510, the computing device 100 sets the size of the virtual storage device (e.g., a virtual disk 214, 224) for a guest operating system (e.g., a guest OS 212, 222) to equal the size of the physical data storage device 116, 117. At block 512, the computing device 100 aligns the locations of the partitions assigned to the guest OS virtual storage device with the locations of the corresponding physical disk partitions (e.g., partitions 118, 120). For example, the computing device sets the value of the virtual location identifier identifying the location of the partition on the virtual storage device (e.g., vLBA) equal to the value of the physical location identifier identifying the location of the partition on the physical data storage device 116, 117 (e.g., the pLBA). At block 514, the computing device virtualizes the boot sector of the physical data storage device 116, 117, e.g., by creating a virtual instance of the boot sector in the VM running the guest OS. The virtual boot sector contains a virtual partition table that defines the partitions to which the guest OS has access as well as the type of access. With the vLBA set equal to the pLBA, the guest OS can directly access the partitions of the data storage device 116, 117 that have been assigned to the virtual storage device supporting the guest OS.

At block 516, the computing device 100 protects the partitions/sectors of the physical data storage device 116, 117 that are not assigned to the virtual storage device supporting the guest OS, so that the guest OS cannot directly access those other, non-assigned portions of the data storage device 116, 117. To do this, at block 518, the computing device maps the partitions/sectors that are not assigned to the guest OS virtual storage device to pattern sectors, which do not have backing storage (e.g., NULL patterns that are not stored on the data storage device 116, 117). Thus, as a result of the method 500, the guest OS can directly access the contents of partitions of the physical data storage device 116, 117, but cannot directly access other contents of the data storage device 116, 117.

EXAMPLES

Illustrative examples of the technologies disclosed herein are provided below. An embodiment of the technologies may include any one or more, and any combination of, the examples described below.

Example 1 includes A computing device for supporting multiple operating system environments, including: a physical data storage device comprising a plurality of partitions, a first native operating system stored in one of the partitions; a second native operating system stored in a different partition; boot code to establish a native environment to run the first native operating system; and a virtualization service executable by the computing device to run the second native operating system as a guest operating system in a virtualized environment by defining a virtual storage device to: allow the guest operating system to directly access a partition of the physical data storage device that is assigned to the guest operating system; and protect, from access by the guest operating system, another partition of the physical data storage device that is not assigned to the guest operating system.

Example 2 includes the subject matter of Example 1, wherein each of the partitions of the physical storage device is accessed by a physical location identifier, and the virtualization service is to create the virtual storage device by mapping each physical location identifier to a corresponding virtual location identifier identifying the location of the partition on the virtual storage device.

Example 3 includes the subject matter of Example 2, wherein the virtualization service is to set the value of each virtual location identifier to match the corresponding physical location identifier.

Example 4 includes the subject matter of Example 2 or claim 3, wherein the virtualization service is to set the virtual location identifier identifying the location of the partition assigned to the guest operating system on the virtual storage device to match the physical location identifier of the partition assigned to the guest operating system.

Example 5 includes the subject matter of Example 4, wherein the virtualization service is to map the partition of the physical storage device that is not assigned to the guest operating system to a pattern sector on the virtual storage device.

Example 6 includes the subject matter of Example 5, wherein the virtualization service is to create the pattern sector to include a pattern of data that is (i) readable by the guest operating system and (ii) not stored on the physical storage device.

Example 7 includes the subject matter of Example 5 or claim 6, wherein the virtualization service is to create the pattern sector to be readable by the guest operating system and unwritable by the guest operating system.

Example 8 includes the subject matter of Example 4, wherein the virtualization service is to define the size of the virtual storage device to match the size of the physical storage device.

Example 9 includes the subject matter of any of Examples 1-3, wherein the computing device comprises boot code stored in the physical storage device, and the virtualization service is to virtualize the boot code to allow the guest operating system to access the partition of the physical storage device that is assigned to the guest operating system.

Example 10 includes the subject matter of any of Examples 1-3, wherein the virtualization service is to create the virtual storage device by assigning a subset of the partitions of the physical storage device to the virtual storage device and representing the partitions that are not in the subset as pattern sectors.

Example 11 includes the subject matter of any of Examples 1-4, wherein the computing device is to switch between the native operating system environment and another native operating system environment to run the second native operating system, and the computing device is to switch between one of the native operating system environments and the guest operating system, and the computing device is to switch between two different guest operating system environments.

In an Example 12, a method for supporting multiple operating system environments on the same computing device includes: partitioning a physical data storage device of the computing device to include a plurality of partitions; installing at least two different operating systems in different partitions of the physical data storage device; and for at least one of the operating systems, creating a virtual storage device to allow the operating system to run as a guest operating system in a virtualized environment of the computing device by directly accessing partitions of the physical data storage device that are assigned to the guest operating system.

Example 13 includes the subject matter of Example 12, wherein the creating of the virtual storage device comprises defining the size of the virtual storage device to match the size of the physical data storage device.

Example 14 includes the subject matter of Example 12, wherein each of the partitions of the physical storage device is accessed by a physical location identifier, and the creating of the virtual storage device comprises mapping each physical location identifier to a corresponding virtual location identifier identifying the location of the partition on the virtual storage device.

Example 15 includes the subject matter of Example 14, wherein the creating of the virtual storage device comprises setting the value of each virtual location identifier to match the value of the corresponding physical location identifier.

Example 16 includes the subject matter of Example 15, wherein the creating of the virtual storage device comprises setting the virtual location identifier identifying the location of the partition assigned to the guest operating system on the virtual storage device to match the physical location identifier of the partition assigned to the guest operating system.

Example 17 includes the subject matter of Example 16, wherein the creating of the virtual storage device comprises mapping the partition of the physical storage device that is not assigned to the guest operating system to a pattern sector on the virtual storage device.

Example 18 includes the subject matter of Example 17, and includes creating the pattern sector to include a pattern of data that is (i) readable by the guest operating system and (ii) not stored on the physical storage device.

Example 19 includes the subject matter of Example 18, and includes creating the pattern sector to be readable by the guest operating system and unwritable by the guest operating system.

Example 20 includes the subject matter of Example 12, wherein the computing device comprises boot code stored in the physical storage device, and the method includes virtualizing the boot code to allow the guest operating system to access the partition of the physical storage device that is assigned to the guest operating system.

Example 21 includes the subject matter of Example 12, and includes creating the virtual storage device by assigning a subset of the partitions of the physical storage device to the virtual storage device and representing the partitions that are not in the subset as pattern sectors.

Example 22 includes the subject matter of Example 12, and includes switching between native operating system environments, and switching between a native operating system environment and a guest operating system environment, and switching between different guest operating system environments.

In an Example 23, one or more machine readable storage media includes a plurality of instructions stored thereon that in response to being executed result in a computing device performing the method of any of Examples 12-22.

In an Example 24, a computing device includes means for executing the method of any of Examples 12-22.

The invention claimed is:

1. A computing device for supporting multiple operating system environments, the computing device comprising:
a physical data storage device comprising a plurality of partitions, a first native operating system stored in one of the partitions, wherein each of the partitions of the physical storage device accessible by a physical location identifier;
a second native operating system stored in a different partition;
boot code to establish a native environment to run the first native operating system; and
a virtualization service executable by the computing device to run the second native operating system as a guest operating system in a virtualized environment by defining a virtual storage device to:
create the virtual storage device by mapping each physical location identifier to a corresponding virtual location identifier identifying the location of the partition on the virtual storage device;
set the virtual location identifier that identifies the location of the partition assigned to the guest operating system on the virtual storage device to match the physical location identifier of the partition assigned to the guest operating system;

map the partition of the physical storage device that is not assigned to the guest operating system to a pattern sector on the virtual storage device, wherein the virtualization service is to create the pattern sector by virtually padding the non-assigned partitions with dummy data;

allow the guest operating system to directly access a partition of the physical data storage device that is assigned to the guest operating system; and protect, from access by the guest omitting system, another partition of the physical data storage device that is not assigned to the guest operating system.

2. The computing device of claim 1, wherein the virtualization service is to set the value of each virtual location identifier to match the corresponding physical location identifier.

3. The computing device of claim 1, wherein the virtualization service is to create the pattern sector to include a pattern of data that is (i) readable by the guest operating system and (ii) not stored on the physical storage device.

4. The computing device of claim 1, wherein the virtualization service is to create the pattern sector to be readable by the guest operating system and unwritable by the guest operating system.

5. The computing device of claim 1, wherein the virtualization service is to define the size of the virtual storage device to match the size of the physical storage device.

6. The computing device of any of claim 1, wherein the computing device comprises boot code stored in the physical storage device, and the virtualization service is to virtualize the boot code to allow the guest operating system to access the partition of the physical storage device that is assigned to the guest operating system.

7. The computing device of any of claim 1, wherein the visualization service is to create the virtual storage device by assigning a subset of the partitions of the physical storage device to the virtual storage device and representing the partitions that are not in the subset as pattern sectors.

8. The computing device of any of claim 1, wherein the computing device is to switch between the native operating system environment and another native operating system environment to run the second native operating system, and the computing device is to switch between one of the native operating system environments and the guest operating system, and the computing device is to switch between two different guest operating system environments.

9. A method for supporting multiple operating system environments on the same computing device, the method comprising:

partitioning a physical data storage device of the computing device to include a plurality of partitions, wherein each of the partitions of the physical storage device is accessible by a physical location identifier;

installing at least two different operating systems in different partitions of the physical data storage device; and for at least one of the operating systems, creating a virtual storage device to allow the operating system to run as a guest operating system in a virtualized environment of the computing device by (i) mapping each physical location identifier to a corresponding, virtual location identifier that identifies the location of the partition on the virtual storage device, (ii) setting the virtual location identifier identifying the location of the partition assigned to the guest operating system on the virtual storage device to match the physical location identifier of the partition assigned to the guest operative system, (iii) mapping the partition of the physical storage device that is not assigned to the guest operating system to a pattern sector on the virtual storage device, and (iv) directly accessing partitions of the physical data storage device that are assigned to the guest operating system, wherein the virtualization service is to create the pattern sector by virtually padding the non-assigned partitions/sectors with dummy date.

10. The method of claim 9, wherein the creating of the virtual storage device comprises defining the size of the virtual storage device to match the size of the physical data storage device.

11. The method of claim 9, comprising creating the pattern sector to include a pattern of data that is (i) readable by the guest operating system and (ii) not stored on the physical storage device.

12. The method of claim 11, comprising creating the pattern sector to be readable by the guest operating system and unwritable by the guest operating system.

13. The method of claim 9, wherein the computing device comprises boot code stored in the physical storage device, and the method comprises virtualizing the boot code to allow the guest operating system to access the partition of the physical storage device that is assigned to the guest operating system.

14. The method of claim 9, comprising creating the virtual storage device by assigning a subset of the partitions of the physical storage device to the virtual storage device and representing the partitions that are not in the subset as pattern sectors.

15. The method of claim 9, comprising switching between native operating system environments, and switching between a native operating system environment and a guest operating system environment, and switching between different guest operating system environments.

16. One or more non-transitory machine readable storage media comprising a plurality of instructions stored thereon that in response to being executed result in a computing device:

partitioning a physical data storage device of the computing device to include a plurality of partitions, wherein each of the partitions of the physical storage device is accessible by a physical location identifier;

installing at least two different operating systems in different partitions of the physical data storage device; and for at least one of the operating systems, creating a virtual storage device to allow the operating system to run as a guest operating system in a virtualized environment of the computing device by (i) mapping each physical location identifier to a corresponding virtual location identifier that identifies the location of the partition on the virtual storage device, (ii) settings the virtual location identifier that identifies the location of the partition assigned to the guest operating system on the virtual storage device to match the physical location identifier of the partition assigned to the guest operating system, (iii) mapping the partition of the physical store device that is not assigned to the guest operating system to a pattern sector on the virtual storage device, and (iv) directly accessing partitions of the physical data storage device that are assigned to the guest operating system, wherein the virtualization service is to create the pattern sector by virtually padding the non-assigned partitions/sectors with dummy data.

17. The one or more non-transitory machine readable storage media of claim 16, wherein the instructions comprise defining the size of the virtual storage device to match the size of the physical data storage device.

18. The one or more non-transitory machine readable storage media of claim 16, wherein the instructions comprise creating the pattern sector to include a pattern of data that is (i) readable by the guest operating system and (ii) not stored on the physical storage device.

19. The one or more non-transitory machine readable storage media of claim 16, wherein the instructions comprise switching between native operating system environments, and switching between a native operating system environment and a guest operating system environment, and switching between different guest operating system environments the query.

* * * * *